(12) United States Patent
Brundridge et al.

(10) Patent No.: US 7,555,666 B2
(45) Date of Patent: Jun. 30, 2009

(54) POWER PROFILING APPLICATION FOR MANAGING POWER ALLOCATION IN AN INFORMATION HANDLING SYSTEM

(75) Inventors: Michael A. Brundridge, Georgetown, TX (US); Alan Brumley, Cedar Park, TX (US)

(73) Assignee: Dell Products L.P., Round Rock, TX (US)

( * ) Notice: Subject to any disclaimer, the term of this patent is extended or adjusted under 35 U.S.C. 154(b) by 434 days.

(21) Appl. No.: 11/381,577

(22) Filed: May 4, 2006

(65) Prior Publication Data

US 2007/0260896 A1 Nov. 8, 2007

(51) Int. Cl.
G06F 1/00 (2006.01)
G06F 11/30 (2006.01)

(52) U.S. Cl. .................. 713/340; 713/300; 713/320

(58) Field of Classification Search .......... 713/300, 713/320, 340
See application file for complete search history.

(56) References Cited

U.S. PATENT DOCUMENTS

| 4,672,364 | A | 6/1987 | Lucas | 340/365 |
|---|---|---|---|---|
| 5,557,557 | A | 9/1996 | Frantz et al. | 364/578 |
| 6,125,334 | A | 9/2000 | Hurd | 702/60 |
| 7,210,048 | B2* | 4/2007 | Bodas | 713/320 |
| 2003/0065958 | A1* | 4/2003 | Hansen et al. | 713/300 |
| 2003/0191791 | A1 | 10/2003 | Cyran et al. | 709/100 |
| 2003/0191976 | A1 | 10/2003 | Cyran et al. | 713/340 |
| 2003/0191986 | A1 | 10/2003 | Cyran et al. | 714/32 |
| 2004/0163001 | A1* | 8/2004 | Bodas | 713/300 |
| 2004/0268159 | A1 | 12/2004 | Aasheim et al. | 713/300 |
| 2005/0177327 | A1 | 8/2005 | Banginwar et al. | 702/60 |
| 2006/0149978 | A1* | 7/2006 | Randall et al. | 713/300 |
| 2007/0245162 | A1* | 10/2007 | Loffink et al. | 713/300 |

* cited by examiner

*Primary Examiner*—Chun Cao
*Assistant Examiner*—Jaweed A Abbaszadeh
(74) *Attorney, Agent, or Firm*—Baker Botts L.L.P.

(57) ABSTRACT

A method, system, and software instructions for allocating power in a information handling system are operable to respond to a power profiling request by transitioning a processing resource to a first power consumption state and obtaining and storing a first power consumption value. The first power consumption value is then retrieved and used to allocate power to the first processing resource in response to a power on request. The first power consumption state may be a state in which power consumption approximates a maximum power consumption. The processing resource may be further transitioned to a second power consumption state and a second power consumption value obtained. The second power consumption state may be a reduced performance state. Thereafter, responsive to determining that the system lacks sufficient power budget to fulfill a pending request for power, the processing resource is throttled and power is allocated using the second power consumption value.

21 Claims, 5 Drawing Sheets

POWER PROFILING APPLICATION FOR MANAGING POWER ALLOCATION IN AN INFORMATION HANDLING SYSTEM

TECHNICAL FIELD

The present invention is in the field of information handling systems including computer systems and, more particularly, in the field of power management for information handling systems.

BACKGROUND OF THE INVENTION

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

One type of information handling system is a server, which is a processor-based network device that manages network resources. As examples, a file server is dedicated to storing files, a print server manages one or more printers, a network server manages network traffic, and a database server processes database queries. A Web server services Internet World Wide Web pages.

In recent years, servers have been implemented as "blade servers." Blade servers are so named because they employ server blades, which are thin, modular electronic circuit boards containing one or more microprocessors, memory, and other server hardware and firmware. Blade servers, which are sometimes referred to as a high-density servers, typically include a space saving, rack-based chassis that accepts multiple server blades. Blade servers are often used in clusters of servers dedicated to a single task. For example, a blade server may function as a web server by servicing web-based requests addressed to one or more universal resource locators (URLs). In this implementation, the blade server may route individual requests to different server blades within the blade server based on factors including the current loading of individual blades and the locality of information required to respond to a request, all in a manner that is transparent to the user.

In addition to server blades, which provide the core processing resources of a blade server, blade servers may also include a management resource, power supply resources, I/O resource, and environmental control resources such as fans. A management resource enables remote access to the blade server and to the individual server blades within the blade server. Management resources enable an administrator to power on, reboot, and power down individual server blades as needed or in response to warnings, failures, and the like.

Power management and power conservation is an increasingly important consideration in the design and implementation of information handling systems in general and blade servers especially. Power consumption is not only costly, but it also generates heat that must be dissipated to maintain performance parameters as well as the electrical and mechanical integrity of the server. Traditional blade server implementations impose power restrictions on individual blades based on static power levels provided by the blade to ensure that power capacity is not exceeded. Moreover, the static level provided the blade in such implementations is typically based on a theoretical maximum power draw based on the blade's maximum configuration. Because the power management implementation is founded upon the maximum power draw, power allocation is necessarily overly conservative, resulting in denial of power up requests or forced performance throttling of server blades when, in reality, sufficient power is available.

SUMMARY OF THE INVENTION

Therefore a need has arisen for an information handling system operable to manage and allocate power to modular resources of the system dynamically and based on actual power consumption of the system's resources.

In one aspect, an information handling system with power profiling functionality is described. The information handling system includes an information handling resource, a power supply resource configured to provide power to the information handling resource, a power profiling module to transition the information handling resource to a first power consumption state, and a power monitoring module to record a level of power supplied by the power supply resource while the information handling resource is in the first power consumption state.

In a computer application, the information handling resource may include at least one processor and system memory accessible to the processor(s). The information handling resource may be implemented as a server blade that includes a printed circuit board to which the processors and system memory are connected. The information handling system as a whole may be a blade server that has a chassis with multiple rack slots suitable for receiving multiple server blades.

The information handling resource may be characterized by a maximum power consumption and the first power consumption state may be a state in which the power consumption of the processing resource exceeds a specified percentage of the maximum power consumption. The power profiling module may be operable to transition the information handling system to a second power consumption state and the power monitoring module may be further operable to record a second level of power supplied by the power supply resource while the information handling resource is in the second power consumption state. As an example, the first power consumption state could be a high power consumption state and the second power consumption state could be a throttled power consumption state The power profiling module could use additional power consumption states such as states in which memory power consumption is maximized or minimized state, states in which central processor activity is maximized or minimized, and so forth. In addition, the power profiling module could further use default power consumption values. Default power consumption values might, for example, represent theoretically derived or projected power consumption values for a given processing resource. Default power consumption values might be used, for example, before any profiled measured values have been obtained.

The information handling system may include a management resource coupled to the information handling resource that is operable to allocate power to the information handling resource preferably in response to a request for power from the information handling resource. The request preferably indicates at least the first level of power and the management resource determines a power allocation based at least in part on the indicated first level of power. In this manner, the information handling system includes centrally managed power allocation that is tuned to the actual power consumption of the information handling resource.

In another aspect, a method of managing power allocation in an information handling system responding to a power profiling request from a processing resource by informing a management module of the request and transitioning the processing resource to a first power consumption state. While the processing resource is in the first power consumption state, a first power consumption value is monitored, detected, or otherwise obtained and then preferably stored in non volatile storage. The power consumption value indicates the amount of power consumed by the processing resource when is in the first power consumption state. When the processing resource later issues a request for power allocation, the management module or other resource responsible for allocating power in the information handling system, uses the first power consumption value to determine whether sufficient power is available to grant the request and to allocate power to the processing resource. Informing the management module of the power profiling request may include a baseboard management controller of the processing resource issuing the request to the management module.

In some embodiments, obtaining the first power consumption value includes powering off all other processing resources in the information handling system and/or powering off all but a first power supply module of the system and/or powering off all non-essential hardware of the processing resource before obtaining the power consumption value. The first power consumption state may be a "full power state" in which power consumption of the processing resource approximates a theoretical maximum power consumption. The method may further include transitioning the processing resource to a second power consumption state and obtaining a corresponding second power consumption value. The second power consumption state may be a state in which performance is intentionally throttled or otherwise constrained to reduce power consumption. The information handling system may then use the second power consumption value, in conjunction with throttling the processing resource, in a method of allocating power to the system when the sum total of all power budget requests exceed the total available power budget of the system.

In yet another aspect, software is stored on a computer readable storage medium as embedded computer executable instructions for allocating power in a information handling system. The software includes instructions for responding to a power profiling request by transitioning a processing resource to a first power consumption state and instructions for obtaining and storing a value indicative of the power consumption of the first processing resource while in the first power consumption state. The software further includes instructions for retrieving and using the first power consumption value to allocate power to the first processing resource responsive to a power on request from the first processing resource. The first power consumption state may be a full power state in which power consumption of the processing resource approximates a maximum power consumption. The software may further include instructions for transitioning the processing resource to a second power consumption state and obtaining a second power consumption value where the second power consumption state is a performance throttled state. The software in this embodiment could further include instructions for throttling the processing resource and allocating the second power consumption value responsive to determining that the information handling system lacks sufficient power budget to fulfill a pending request for power.

A number of important technical advantages are described herein. One technical advantage is the ability to allocation scarce power efficiently based on measured values of the power consumption characteristics of the resources in a system. Additional advantages will be apparent to those of skill in the art and from the FIGURES, description and claims provided herein.

BRIEF DESCRIPTION OF THE DRAWINGS

A more complete and thorough understanding of the present embodiments and advantages thereof may be acquired by referring to the following description taken in conjunction with the accompanying drawings, in which like reference numbers indicate like features, and wherein.

DETAILED DESCRIPTION OF THE INVENTION

Preferred embodiments of the invention and its advantages are best understood by reference to the drawings wherein like numbers refer to like and corresponding parts.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Preferred embodiments and their advantages are best understood by reference to FIG. 1 through FIG. 4, wherein like numbers are used to indicate like and corresponding parts. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
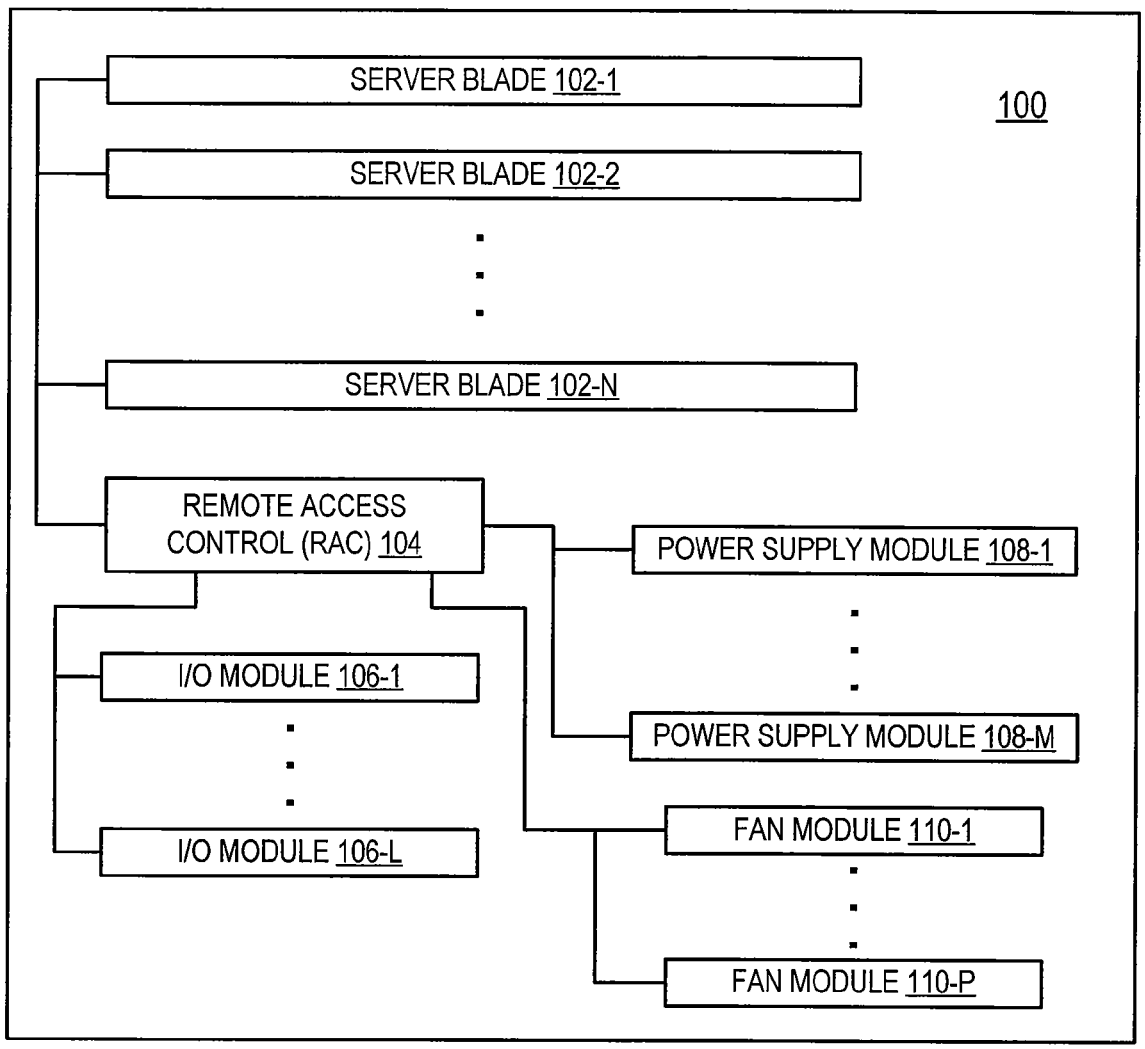
FIG. 1 is a block diagram of selected elements of a information handling system implemented as a blade server.

As indicated previously, one type of information handling system is a server system. A server system may be defined as a system that communicates with one or more client systems for the purposes of exchanging information and performing transactions. A representative server system is the blade server 100 depicted in FIG. 1. Blade server 100 as depicted in FIG. 1 includes information handling resources in the form of server blades 102-1 through 102-N (generically or collectively referred to herein as server blade(s) 102). In this embodiment, the information handling resources may also be referred to as processing resources because server blades 102-1 through 102-N likely include one or more processors, system memory, and so forth.

More generally however, the term information handling resource as used in this disclosures encompasses any resource for which a power profile may be determined whether or not the resource includes traditional processors and system memory. For example, a network switch may serve as a information handling resource even though it cannot directly execute a power profiling application. In this example, a power consumption profile for the switch might be determined by instructing the switch to turn off all off its ports, take a power reading, and sequentially bringing the other ports back on-line, while recording the power consumption values. In this manner, a value representing the power consumed by a switch port can be determined. As other examples, information handling resources could include a persistent storage blade, a printer, system memory elements, I/O adapters, and so forth. Thus, the embodiments described in the drawings, in which the information handling resources are processing resources, are merely illustrative examples.

Returning now to FIG. 1, blade server 100 includes, in addition to server blades 102-1 through 102-N, a management resource or management module in the form of a remote access controller (RAC) 104, I/O resources in the form of I/O modules 106-1 and 106-2 (generically or collectively referred to as I/O module(s) 106), power supply modules 108-1 and 108-2 (generically or collectively referred to as power supply module(s) 108, and environmental resources in the form of fan module(s) 110-1 and 110-2 (generically or collectively referred to as fan module(s) 110.

RAC 104 is connected to server blades 102, I/O modules 106, power supply modules 108, and fan modules 110. In one embodiment, RAC 104 connects to the other resources of blade server 100 using a relatively simple communication link such as an I²C link although other embodiments may employ other types of links such as Ethernet links, general purpose serial links, and the like. RAC 104 is operable to power on, reboot, and power off each server blade 102. In addition, RAC 104 is configured to monitor environmental parameters such as chassis temperature, and to control shared resources including power supply modules 108 and fan modules 110. RAC 104, for example, is operable to detect a thermal warning and respond by turning on fans in fan module(s) 110, reducing power levels supplied by power supply modules 108 and to throttle one or more server blades 102.

Figure 3:
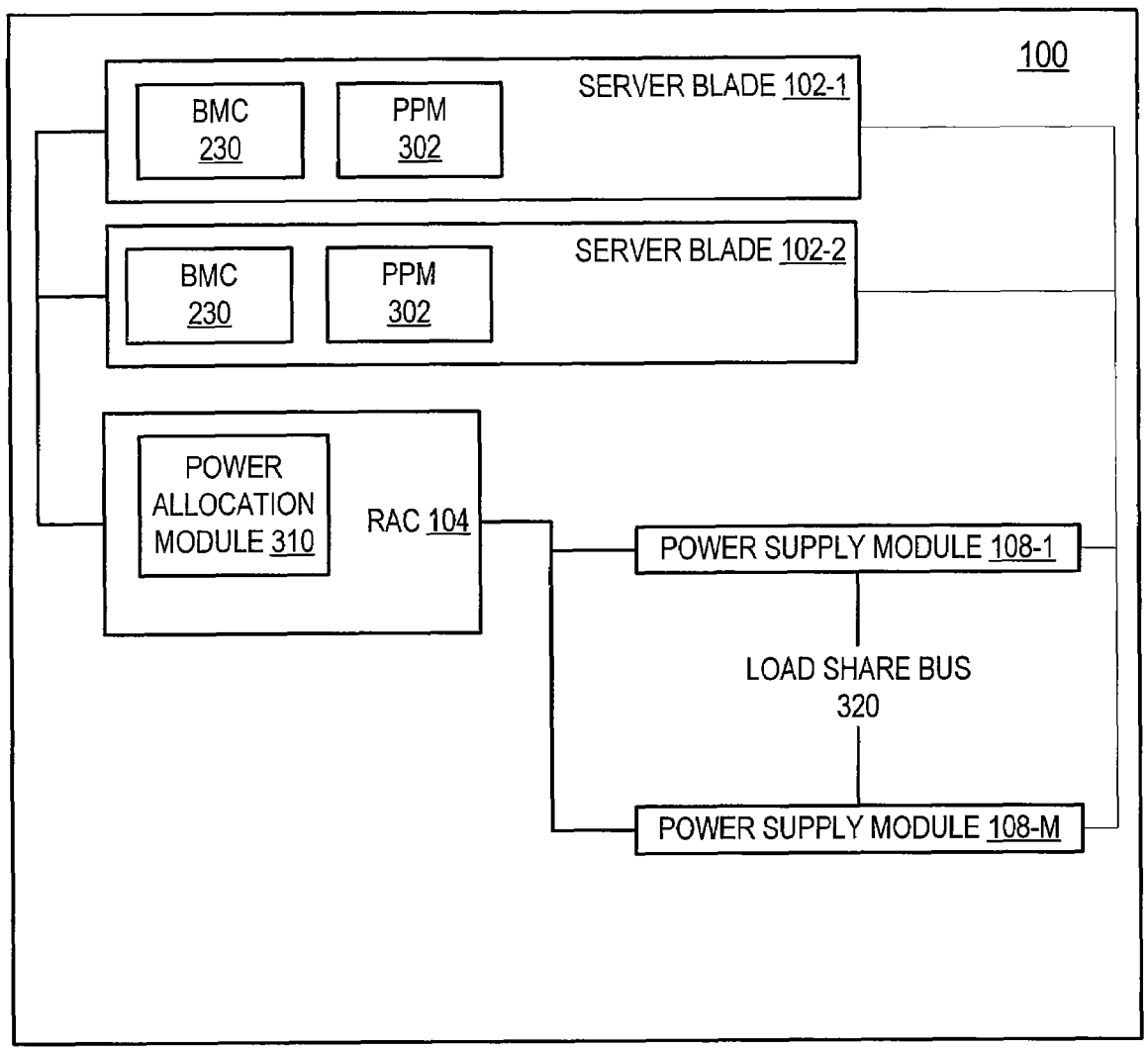
FIG. 3 is an alternative depiction of the information handling system of FIG. 1 emphasizing components needed to implement power profiling functionality.

In one embodiment, RAC 104 is operable to manage the power budget for information handling system 100 and to allocate power to the information handling resources. RAC 104 may include a power allocation module for this purpose. In some embodiments, a RAC power allocation module 310, described in greater detail below with respect to FIG. 3, is preferably responsible for determining whether information handling system 100 has sufficient power available to support the resources within it.

When an additional resource is installed or a request to power up an additional resource is received, the installed or requesting device sends a request to RAC 104, which in turn will determine whether there is sufficient power available to the chassis to grant the request. If sufficient power is available, RAC 104 will preferably power up the resource, indicate a power allocation value to the resource, and adjust the available remaining power by subtracting the amount of power the device allocated to the resource. If a request to power down a resource is submitted, RAC 104 will preferably power down the resource and then adjust the available power by adding back the amount of power previously allocated to the resource.

If a resource submits a request to power up and sufficient power does not exist to grant the request, RAC 104 may queue the request and power up the resource only when sufficient power is later available. Alternatively, if the resource supports throttling and there is sufficient power to power on the device in a throttled mode, RAC 104 may approve power on in throttled state. If a power supply fails, RAC 104 recalculates the power budget and, if sufficient power does not exist to maintain power to all resources, RAC 104 will attempt to power down enough resources to maintain power to information handling system 100 as a whole.

In a preferred embodiment, each server blade 102 is a modular resource, preferably implemented as a printed circuit board containing one or more general purpose microprocessors, system memory accessible to the microprocessor(s), and other hardware/firmware needed for executing an operating system and application programs. In such embodiments, server blades 102 are preferably hot pluggable into racks or slots defined by a chassis (not depicted) of blade server 100. In a suitable embodiment, server blades 102 are plugged into racks from a first side of the blade server chassis while RAC 104, I/O modules 106, power supply modules 108, and fan modules 110 are plugged into racks from a second side of the blade server chassis.

Figure 2:
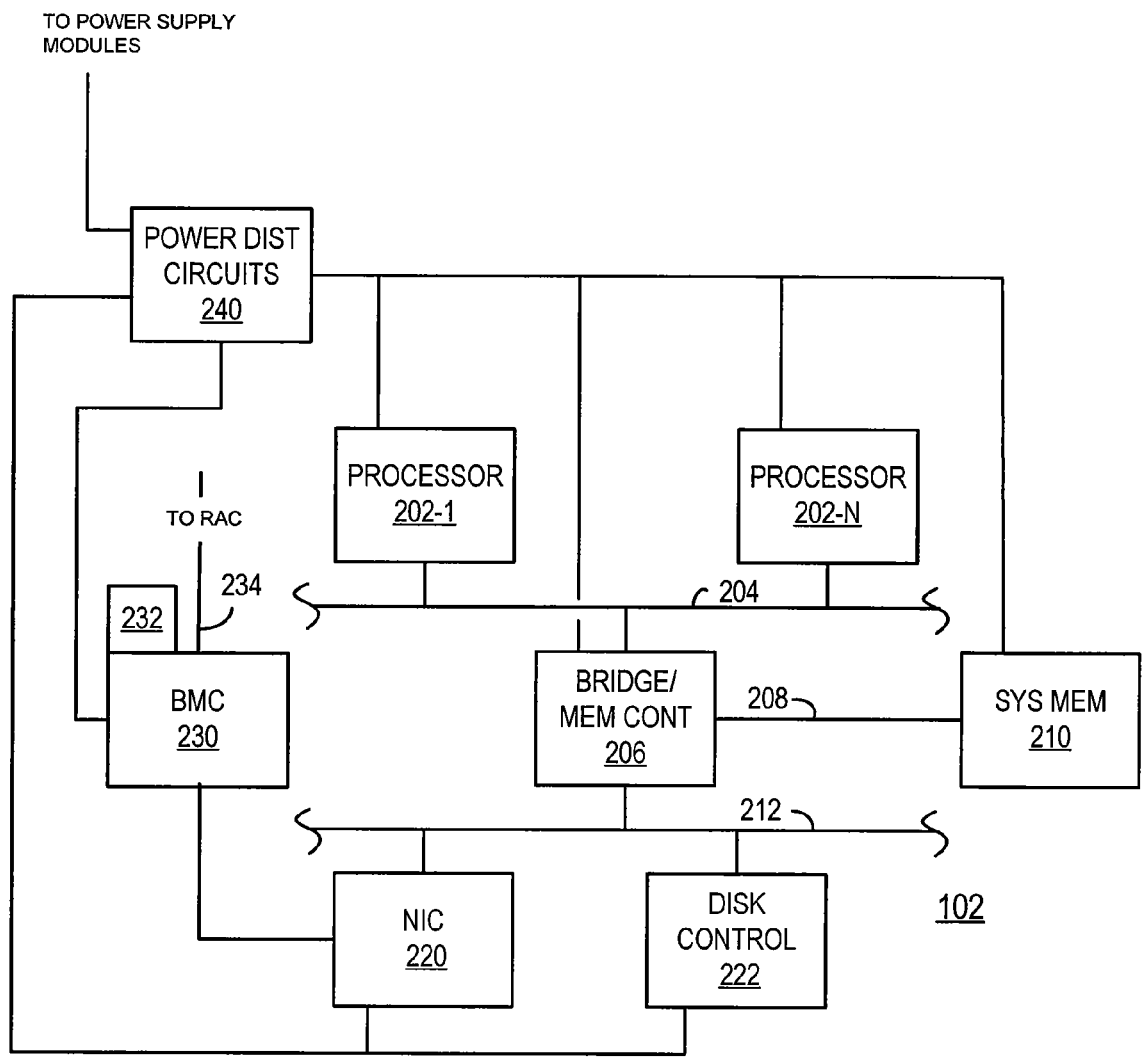
FIG. 2 is a block diagram showing selected elements of a server blade suitable for use in the blade server of FIG. 1.

Referring to FIG. 2, a block diagram of selected elements of a server blade 102 suitable for use in the blade server 100 of FIG. 1 is shown. As depicted in FIG. 2, server blade 102 includes one or more processors 202-1 through 202-N connected to a system bus 204. A bus bridge and memory controller 206 is coupled to system bus 204 to a memory bus 208 that connects a system memory 210 with bridge and memory controller 206. Bridge and memory controller 206 also couples to a peripheral bus 212 to which one or more peripheral adapters may be connected. In the depicted embodiment, for example, the peripheral devices of server blade 102 include a network interface card (NIC) 220 and a disk controller 222 that is coupled to persistent storage (not depicted). In addition, server blade 102 includes a service processor resource in the form of a baseboard management controller (BMC) 230. Although FIG. 2 depicts a BMC specifically, other forms of service processors or comparable resource may be used in alternative implementations.

BMC 230 preferably includes a service processor enabled to monitor the status of server blade 102 and to facilitate remote management capability for administrators. BMC 230 communicates with RAC 104 to log and send alerts on the network. BMC 230 is responsible for monitoring the status of voltage and temperature probes (not depicted) on server blade 102. In one embodiment, when BMC 230 detects an event, the event is written to a BMC System Event Log (SEL) and sent to the RAC 104 via the Intelligent Platform Management Interface (IPMI) 234.

In the depicted embodiment, BMC 230 is connected to NIC 220 of server blade 102 enabling administrators to access BMC 230 using an IPMI utility or Serial over LAN (SOL) commands. In addition, BMC 230 as shown is connected to power distribution circuitry 240. Power distribution circuitry 240 provides a controllable interface between a source of AC power and the functional elements of server blade 203 including the processors 202.

The depicted implementation of BMC 230 also includes power monitoring circuitry 232. Power monitoring circuitry may be a current sensing circuit or another type of circuit capable of monitoring the power consumption of another resource. Although the depicted implementation indicates power monitoring circuitry 232 as residing on BMC 230, other implementations may integrate power monitoring circuitry 232 into power distribution circuitry 240. In either case, BMC 230 has access to information that is indicative of the actual power consumption of server blade 102. Power monitoring circuitry 232 may be operable to indicate instantaneous power consumption and/or include an integrator or other circuit suitable for determining an average value of power consumption over a specified time interval. Still other embodiments of BMC 230 and server blade 102 may be implemented without power monitoring circuits.

In one aspect, information handling system 100 is operable to profile the power consumption of its individual processing resources and allocate power based upon the profile of power consumption data. The ability to obtain real time power consumption information for individual processing resources beneficially enables information handling system 100 to allocate its available budget in an efficient manner that permits a greater number of resources to operate simultaneously.

In the absence of the ability to obtain dynamic and real time power profiling information, information handling system 100 would generally have to allocate power to individual processing resources based upon static and usually theoretically derived values for the power consumption of individual processing resources. As a general rule, these predetermined maximum power values have been extremely conservative to reflect the most power that the processing resource could ever require in operation.

As an example, a conventional method of allocating a maximum power value for an individual processing resource may be obtained by first determining how much power the resource draws if the resource processors are exercised at their maximum rate. An additional step may then be performed in which the tester determines the maximum amount of power required to operate the system memory in its highest power consumption state. These two values may then be added together to obtain a total value for maximum power consumption by information handling resource.

Unfortunately, the individual power consumption values obtained in the described manner are not amendable to straight forward addition to obtain an accurate value of total system power requirements. Frequently, for example, when one or more processors of an information handling resource are operating at a maximum level of power consumption activity, the system memory may or may not be getting exercised in a manner that maximizes the system memory power consumption. Conversely, significant memory activity that would induce substantial power consumption within the system memory, may not necessarily occur when the resource processors are operating at their full capacity. In this example, merely adding the two maximum power values together will result in an unnecessarily large value for the processing resource as a whole. Among the benefits of implementing power profiling functionality as described herein is the ability to obtain real time information regarding actual power consumption.

Turning now to FIG. 3, information handling system 100 includes server blades 102-1 through 102-2 (generically or collectively referred to herein as server blades 102). Each server blade 102 as depicted in FIG. 3 includes a power profiling module (PPM) 302. The PPM 302 is preferably implemented as a set or sequence of computer executable instructions stored on a computer readable medium. In such embodiments, PPM 302 preferably resides in or is embedded within a persistent storage facility such as a hard disk or other storage unit of information handling system 100. PPM 302 in the preferred embodiment is operable to transition server blades 102 or other information handling resources into predefined power consumption states. In such instances, the individual power consumption states into which PPM 302 transitions processing resources 102 may be designed to exercise all or a specific subset of the resources within server blade 102. Thus, for example, PPM 302 may be operable to transition information handling resource 102 into a first power consumption state using a first power profiling thread and a second power consumption state using a second power consumption thread. The first power consumption state may correlate to a maximum power consumption state of server blade 102. A second power consumption state may, in one embodiment, represent the power consumption state in which performance of server blade 102 has been intentionally throttled by information handling system 100 for RAC 104.

Although FIG. 3, depicts PPM 203 in conjunction with server blades 102, a standalone or monolithic system having current sensing device that can be read by a service processor could also employ a power profiling module. Consider, for example, a monolithic server included three power supplies to fully utilize all the of its components installed. If one of the power supplies goes away (fails or is removed), the system would traditionally be prevented from powering on. However, if the monolithic system included a power profiler analogous to PPM 203, the system may have determined from the power profiler that, based on actual power consumption measurements, the remaining two power supplies delivered sufficient power to enable the system to power up and run. Accordingly, the power profiling functionality of PPM 203 as depicted in FIG. 3 is generally suitable for any system that requires or otherwise employs multiple power sources to achieve power on and operation.

Returning to the embodiment depicted in FIG. 3, RAC 104 includes a power allocation module 310. Power allocation module 310 is configured to communicate with individual server blades 102 and, more specifically, with a BMC 230 of server blade 102 to perform the power profiling sequence. RAC 104 and power allocation module 310 are connected to and further operable to monitor the power consumption of power supply modules 108-1 through 108-m. In the embodiment depicted in FIG. 3, for example, a group of power supply modules 108-1 through 108-m (generically or collectively referred to herein as power supply modules 108) are connected via a load share bus 320. Load share bus 320 is configured to maintain the power drive on the individual power supply modules 108 in roughly equal proportions so that all of the power supply modules 108 are providing a substantially equivalent value of power at any given time. Although the implementation depicted in FIG. 3 illustrates a load share bus 320, other embodiments of a power profiling application may include functionality that permits RAC 104 to inquire or query the power supply module 108 directly. For example, RAC 104 and power supply modules 108 may be compliant with the IPMI specification. Moreover, the target device, which is the device for which a power profile is desired, (e.g., blade, IO module, etc.) may have its own current sensing device. In such cases, the target device can monitor and measure its power consumption directly and RAC could use this value instead of referring to the load share bus 320.

After PPM 302 has transitioned a server blade 102 to a power consumption state, RAC 104 is configured to obtain power consumption data by detecting the amount of power required to operate power supply modules 108 while a server blade 102 is in the selected power consumption state. The power profiling data obtained may be used by server blades 102 and/or RAC 104 when allocating power to resources that are just coming online. Thus, information handling system 100 as depicted in FIG. 3 includes one or more information handling resources represented by server blades 102, one or more power supply modules 108 operable to provide power to the server blades 102, and a management resource in the form of RAC 104. RAC 104 communicates with server blades 102 and, more specifically, a service processor resource such as BMC 230, to invoke PPM 302 to cause server blade 102 to enter one or more predefined power consumption states and obtain power consumption data. The power consumption data obtained in this manner may be stored and subsequently used by power allocation module 310 when RAC 104 later is required to allocate power to a server blade 102.

Some embodiments of the power profiling functionality described herein are implemented with elements that may include computer executable instructions (computer software) that, when executed by a processor in an information handling system, causes the information handling system to profile the power consumption of an information handling resource. In such embodiments, the instructions are stored on or embedded in a computer readable medium. The medium may be a volatile medium (e.g., system memory (RAM) or cache memory (SRAM)) during periods when instructions are being executed. The medium may also be a persistent medium such as a hard disk, CD, DVD, magnetic tape, and the like, during periods when instructions are not being executed.

Figure 4:
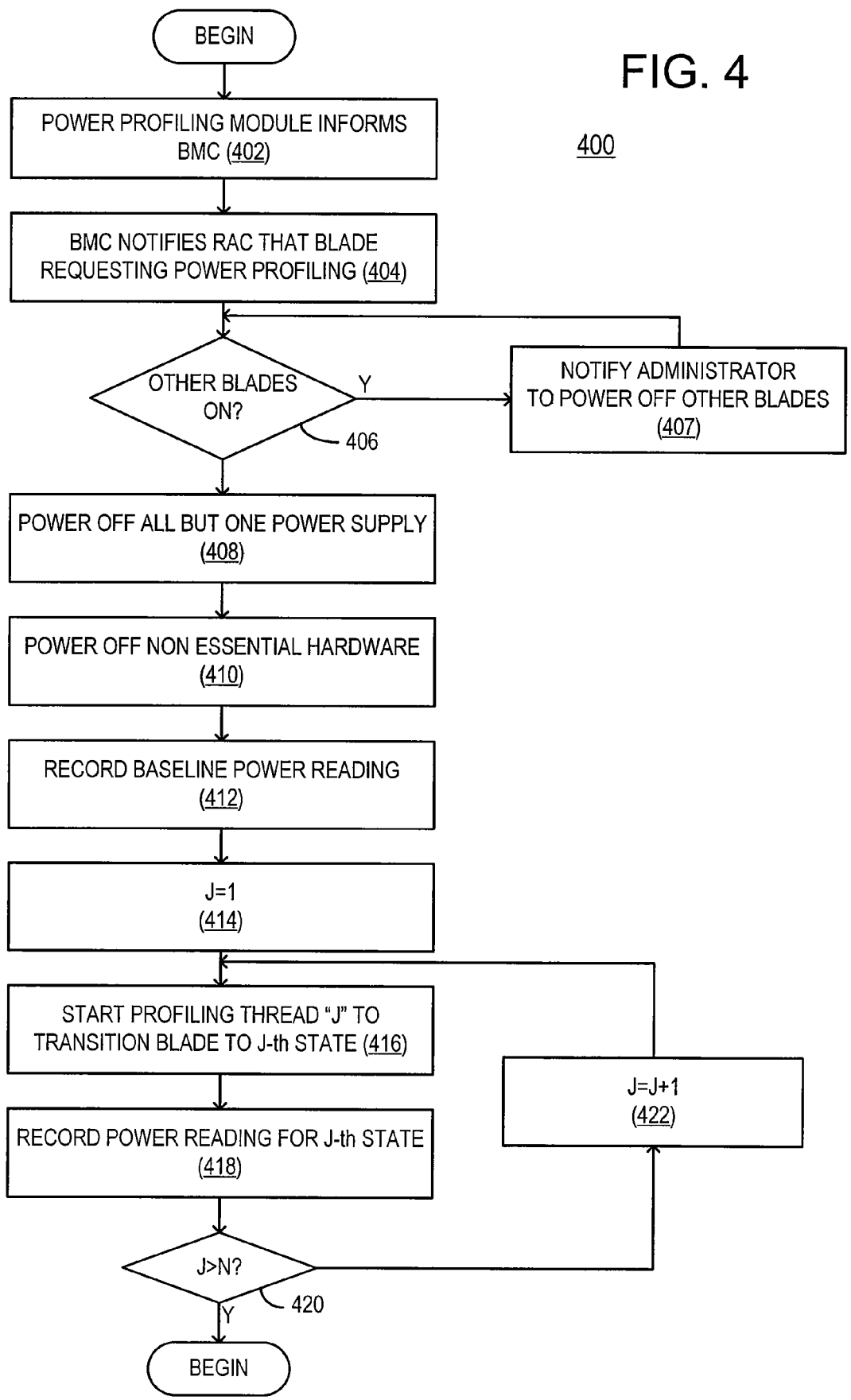
FIG. 4 is a flow diagram depicting selected elements of a method of implementing power profiling for an information handling system.

Turning now to FIG. 4, selected elements of a method 400 of performing power profiling in an information handling system such as information handling system 100 is described. In the depicted environment, power profiling method 400 includes an initial block 402 in which a power profiling module, preferably installed on an information handling resource such as a server blade 102, informs its local service processor or BMC 230 that the power profiling module 302 has been invoked. A PPM 302 may be invoked by an administrator or a user of information handling system 100. As depicted in FIG. 4, a BMC 230, in response to receiving a notification from PPM 302, notifies (block 404) RAC 104 that the corresponding server blade 102 is requesting a power profiling.

The embodiment of method 400 depicted in FIG. 4 preferably obtains the most accurate value of power consumption attributable to each server blade 102 that is possible. As part of the objective of obtaining accurate power consumption values, the depicted embodiment of method 400 includes powering off all other processing resources within the system. Thus, as depicted in FIG. 4, method 400 includes determining (block 406) whether any other information handling resources are powered on. If other information handling resources are powered on, method 400 notifies (block 407) an administrator or other user of information handling system 100 to power off the other blades before continuing with the power profiling application. In other embodiments, the RAC 104 may automatically power down all other processing resources or server blades before proceeding.

It should by understood however, that the need to power off other processing resources is not necessary for an embodiment in which the target device is able to measure current draw other than via the load share bus 320. If, for example, the target device has a current sensing device which can be sampled, then other devices in the chassis can remain powered on because the current sensing device on the target device can be used to take an accurate reading of the target's power consumption during the power profiling.

In the depicted embodiment, method 400 further includes powering off (block 408) all but one power supply module 108 of information handling system 100. This embodiment is suitable for applications in which the power monitoring includes monitoring a load share bus 320 as described above with respect to FIG. 3. The load share bus 320 attempts to balance all of the power supplies so that each power supply module 108 is providing a substantially equal amount of the power supply to the system. Inevitably, the power supplied by the individual power supply modules 108 will vary slightly from one to the other. In such cases, the value or voltage of load share bus 320 may not reflect the actual power being supplied by a module 108. By powering off all but one of the power supply modules 108, the load share bus 320 provides the most accurate information indicative of the power supply by a module 108. In addition to powering off all but one of the power supply modules 108, the depicted implementation of method 400 includes powering off all non-essential hardware (block 410). The non-essential hardware includes, for example, hardware such as the keyboard and mouse. The non-essential hardware more generally refers to hardware not directly connected with the operation of the processors and system memory of processing resource 102.

After powering off all but one of the blades, powering off all but one of the power supply modules, and powering off all non-essential hardware, a measurement of the baseline power consumption is obtained and recorded (block 412). The baseline power reading obtained and recorded in block 412, as its name suggests, provides a measurement of the minimum power required to operate the chassis and the server blade in a standby mode. It will be appreciated that the baseline power reading should be taken with none of the blades powered on. It should be noted that the process of obtaining a baseline power reading is only required for implementations, such as the one depicted in the drawings, where a load share bus is used to determine power consumption and where the targeted device does not include its own current sensing hardware.

After obtaining the baseline power reading in block 412, method 400 includes entering a loop in which the processing resource is transitioned to a known power consumption state. Once the processing resource has stabilized in the known power consumption state, a measurement is taken to determine the amount of power being supplied to maintain the processing resource in the power consumption state. As depicted in FIG. 4, method 400 includes taking a total of N power consumption readings, one for each of N power consumption states. The number of power consumption states for which power profile data is obtained is an implementation detail. In one embodiment, for example, it is sufficient to obtain two power consumption values, one for a "full power" power consumption state and a second value for a "throttled" power consumption state. In other embodiments, method 400 may implement several power consumption readings corresponding to several power consumption states to obtain more detailed information about the power consumption characteristics of the processing resource. The power profiling data obtained during execution of method 400 is recorded and preferably subsequently used by RAC 104 to allocate power efficiently to the processing resources in information handling system 100.

As depicted in FIG. 4, method 400 includes an initialization step (block 414) in which a variable J is initialized to 1. The variable J is used as a counter for each of the power consumption states for which power consumption data is sought. After initializing the counter variable in block 414, method 400 as depicted in FIG. 4 includes starting (block 416) a profiling thread J to transition the processing resource to a Jth power consumption state. Thus, for example, if J is equal to 1, block 416 includes initiating or executing a first profiling thread to transition processor resource 102 to a first power consumption state.

The profiling threads initiated during execution of method 400 are specifically designed to exercise selected elements of processing resource 102. A first profiling thread, for example, may be designed to exercise processing resource 102 in a manner that consumes the greatest possible amount of power. As indicated previously, a second profiling thread may be designed to operate processing resource 102 in a throttled manner to obtain a power consumption value associated with a throttled power consumption state.

In addition to these two power profiling threads that may be executed, other embodiments of method 400 may include profiling threads designed to exercise specific components within processing resource 102 while maintaining other processing resources in a relaxed or lower power consumption state. For example, a profiling thread may be designed to exercise the processors of processing resource 102 at a maximum rate while the system memory and I/O hardware is maintained in a relatively static or lower power consumption state. This type of profiling thread might be suitable for providing the user with information about the power consumption characteristics of the processors as they are installed in processing resource 102.

Other threads may be designed to exercise the system memory heavily while the processors are maintained in a relatively quiet or low power consumption state to determine the power consumption characteristics of the system memory. Each of these values may be useful in allocating power to a processing resource in the most efficient manner possible. If, for example, one has obtained information about the power consumption characteristics of system memory on each of the server blades 102 in information handling system 100, this information may be useful when determining resources that might be powered down to conserve power. For example, having information about the power consumption characteristics of the system memories of each of the processing resources may be valuable in allocating memory intensive applications and for use in determining the effect of powering off one or more resources in an effort to conserve power. Similarly, having information about the power consumption characteristics of individual processors in the various processing resources may be useful in allocating processor intensive applications among the server blades. Moreover, memory power consumption data and processor power consumption data may be useful in determining the effect of powering down one or more processing resources in an effort to conserve power.

Returning to FIG. 4, method 400 includes recording (block 418) the power reading obtained for each of the power profiling threads executed in block 416. In block 420, the counter variable J is compared against the variable N which indicates the number of power consumption states of interest. If J is greater than N, method 400 terminates. If J is not less than N, method 400 includes incrementing (block 422) J and returning to block 416 where the next profiling thread is initiated to transition the processing resource to the next power consumption state.

In an embodiment in which the target device includes its own current sensing device, the power consumption measuring functionality represented included in method 400 FIG. 4 might be achieved with an embedded microcontroller having analog to digital (A/D) conversion functionality. The embedded chip could then either store or send the data to an external persistent storage device. In the case of a monolithic server, a current sensor attached to a BMC or embedded microcontroller along with a power profiler application could perform power profiling and store the results in local disk space, without invoking the RAC at all.

Figure 5:
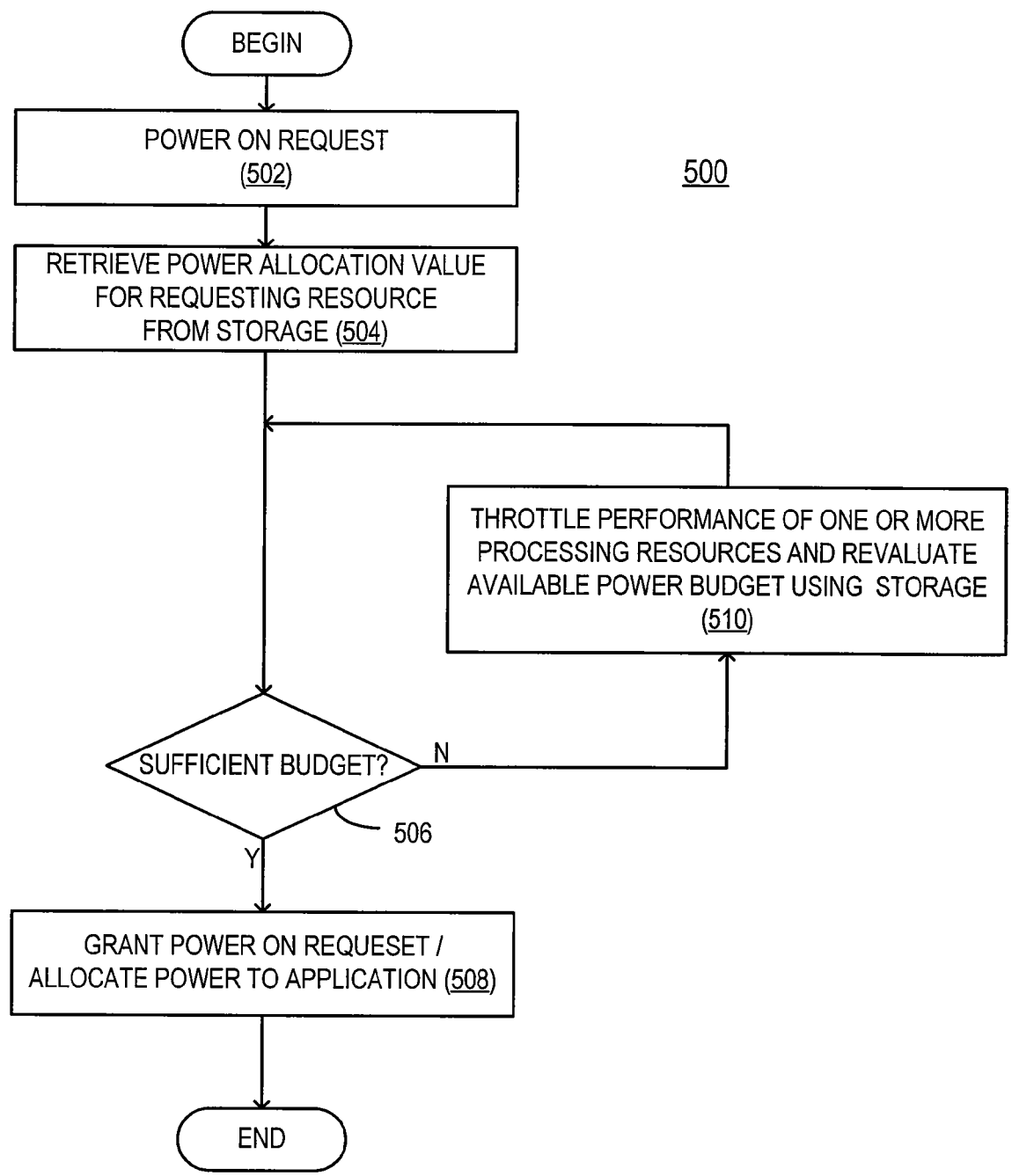
FIG. 5 is a flow diagram depicted selected elements of a method of allocating power in an information handling system.

Turning now to FIG. 5, a flow diagram depicts selected elements of a method 500 of allocating power using the profiled power consumption values obtained as depicted and described with respect to FIG. 4. In the depicted embodiment, method 500 operates preferably after the power profiling method of FIG. 4 has been executed. Method 500 is initiated when a processing resource (or other power consuming resource of information handling system) transmits a power on request (block 502) to a management resource or other suitable resource. The management agent or other processing resource that receives the request retrieves a power allocation value from storage where the retrieved power allocation value is related to the person making the request.

The management module or other resource then determines (block 506) whether there is sufficient available budget to grant the power on request. If there is sufficient power available to fulfill the request, the power allocation requests is granted (block 508). If however, the power budget available to information handling system is insufficient to grant the power on request, the depicted embodiment of method 500 includes throttling (block 510) one or more processing resources and retrieving the throttled power consumption values from storage. Throttling a processing resource, as is known in the field of microprocessor based systems, may include voltage scaling, frequency scaling, various forms of reducing instruction dispatch, and the like. The throttled power consumption values are then used by the management module in its power allocation budget. Method 500 may include throttling one or more processing resources iteratively until the pending power on request can be granted. In this manner, method 500 incorporate extended functionality into the power budgeting process by incorporating, in addition to accurate values of resource power consumption, multiple levels of power consumption values. The additional levels of power consumption values improve the flexibility of the system as a whole.

Although the disclosed embodiments have been described in detail, it should be understood that various changes, substitutions and alterations can be made to the embodiments without departing from their spirit and scope.

What is claimed is:

1. An information handling system, comprising:
   multiple information handling resources;
   a power supply configured to provide power to the multiple information handling resources;
   a management resource coupled to the multiple information handling resources and configured to:
     receive a power profiling request from a particular one of the multiple information handling resources; and
     responsive to the power profiling request, substantially isolate a particular information handling resource by powering off the multiple information handling resources except for the particular information handling resource such that the power supply provides power to the particular information handling resource but not to the powered off information handling resources;
   a power profiling module to transition the particular information handling resource to a first power consumption state; and
   a power monitoring module to record a level of power supplied by the power supply while the isolated particular information handling resource is in the first power consumption state.

2. The system of claim 1, wherein the particular information handling resource is a processing resource including at least one processor and system memory accessible to the processor.

3. The system of claim 2, wherein the multiple information handling resources comprise multiple server blades, each server blade including a printed circuit board to which the processors and system memory are connected and suitable for insertion into a rack based chassis.

4. The system of claim 3, wherein the information handling system comprises a blade server including the chassis, wherein the chassis includes multiple slots suitable for receiving the multiple server blades.

5. The system of claim 1, wherein the power profiling module is further operable to transition the information handling system to a second power consumption state and the power monitoring module is further operable to record a second level of power supplied by the power supply resource while the particular information handling resource is in the second power consumption state.

6. The system of claim 5, wherein the first power consumption state comprises a high power consumption state and the second power consumption state comprises a reduced power consumption state.

7. The system of claim 6, further comprising the management resource operable to allocate power to the particular information handling resource in response to a request for power from the particular information handling resource, wherein the request indicates at least the first level of power and the management resource determines a power allocation based at least in part on the indicated first level of power.

8. The system of claim 1, wherein the multiple information handling resources comprise multiple processing resources.

9. The system of claim 1, wherein:
   the power supply comprises a plurality of power supply modules configured to provide power to the multiple information handling resources; and
   the management resource is further configured to, responsive to the power profiling request, power off all but a first power supply module such that only the first power supply module provides power to the particular information handling resource when the level of power supplied by the power supply is recorded.

10. A method of managing power allocation in an information handling system including multiple processing resources, comprising:
    responsive to a power profiling request from a particular one of the multiple processing resources, informing a management module of the power profiling request;
    responsive to the power profiling request, isolating the particular processing resource by powering off all of the multiple processing resources except for the particular processing resource such that a power supply coupled to multiple processing resources provides power to the particular processing resource but not to the powered off processing resources;
    transitioning the particular processing resource to a first power consumption state;
    while the isolated particular processing resource is in the first power consumption state, obtaining a first power consumption value indicative of an amount of power consumed by the particular processing resource when in the first power consumption state;
    storing the first power consumption value; and
    responsive to a subsequent request for power allocation from the particular processing resource, using the first power consumption value to determine whether sufficient power is available to grant the request and to allocate power to the particular processing resource.

11. The method of claim 10, wherein informing the management module of the power profiling request comprises informing the management module by a service processor of the particular processing resource.

12. The method of claim 10, wherein:
    the power supply comprises a plurality of power supply modules configured to provide power to the multiple processing resources; and
    the method further comprising, prior to obtaining the power consumption value, powering off all but a first power supply module such that only the first power supply module provides power to the particular processing resource when the level of power supplied by the power supply is recorded.

13. The method of claim 10, wherein transitioning the particular processing resource to a first power consumption state comprises transitioning the particular processing resource to a power consumption state in which power consumption of the particular processing resource approximates a maximum power consumption of the particular processing resource.

14. The method of claim 10, further comprising, responsive to the power profiling request, transitioning the particular processing resource to a second power consumption state and obtaining a second power consumption value indicative of an amount of power consumed by the particular processing resource when in the second power consumption state.

15. The method of claim 14, wherein transitioning the particular processing resource to the second power consumption state comprises transitioning the particular processing resource to a power consumption state in which power consumption of the particular processing resource approximates a power consumption of the particular processing resource in a reduced performance state.

16. The method of claim 15, further comprising, responsive to the information handling system determining that insufficient power is available to handle a power allocation request, transitioning the particular processing resource to the throttled performance state and allocating power based at least in part on the second power consumption value.

17. The method of claim 10, wherein:
the power supply comprises multiple power supply modules connected for collectively providing power to the multiple processing resources; and
the method comprises:
prior to obtaining the power consumption value, powering off all but a first power supply module such that only the first power supply module provides power to the particular processing resource when the level of power supplied by the power supply is recorded; and
responsive to the subsequent request for power allocation from the particular processing resource, using the first power consumption value to determine whether sufficient power is available by the multiple power supply modules to grant the request and to allocate a portion of the power from the multiple power supply modules to the particular processing resource.

18. A computer readable storage medium including embedded computer executable instructions for allocating power in a information handling system including multiple processing resources coupled to a power supply, the instructions comprising:
instructions for responding to a power profiling request from a first one of the multiple processing resources by:
isolating the first processing resource by powering off all of the multiple processing resources except for the first processing resource such that the power supply provides power to the first processing resource but not to the powered off processing resources; and
transitioning a the first processing resource to a first power consumption state;
instructions for obtaining and storing a first power consumption value indicative of the power consumption of the isolated first processing resource while in the first power consumption state; and
instructions for subsequently retrieving and using the first power consumption value to allocate power to the first processing resource responsive to a power on request from the first processing resource.

19. The computer readable medium of claim 18, wherein transitioning the first processing resource to a first power consumption state comprises transitioning the first processing resource to a power consumption state in which power consumption of the first processing resource approximates a maximum power consumption of the first processing resource.

20. The computer readable medium of claim 19, further comprising instructions for transitioning the first processing resource to a second power consumption state and obtaining a second power consumption value indicative of power consumption of the first processing resource when in the second power consumption state, wherein the second power consumption state comprises a performance throttled state.

21. The computer readable medium of claim 20, further comprising instructions for throttling the first processing resource and allocating the second power consumption value responsive to determining that the information handling system lacks sufficient power budget to fulfill a pending request for power.

* * * * *